Oct. 2, 1923.
E. S. SEAVEY
FLEXIBLE JOINT
Filed April 3, 1922
1,469,448
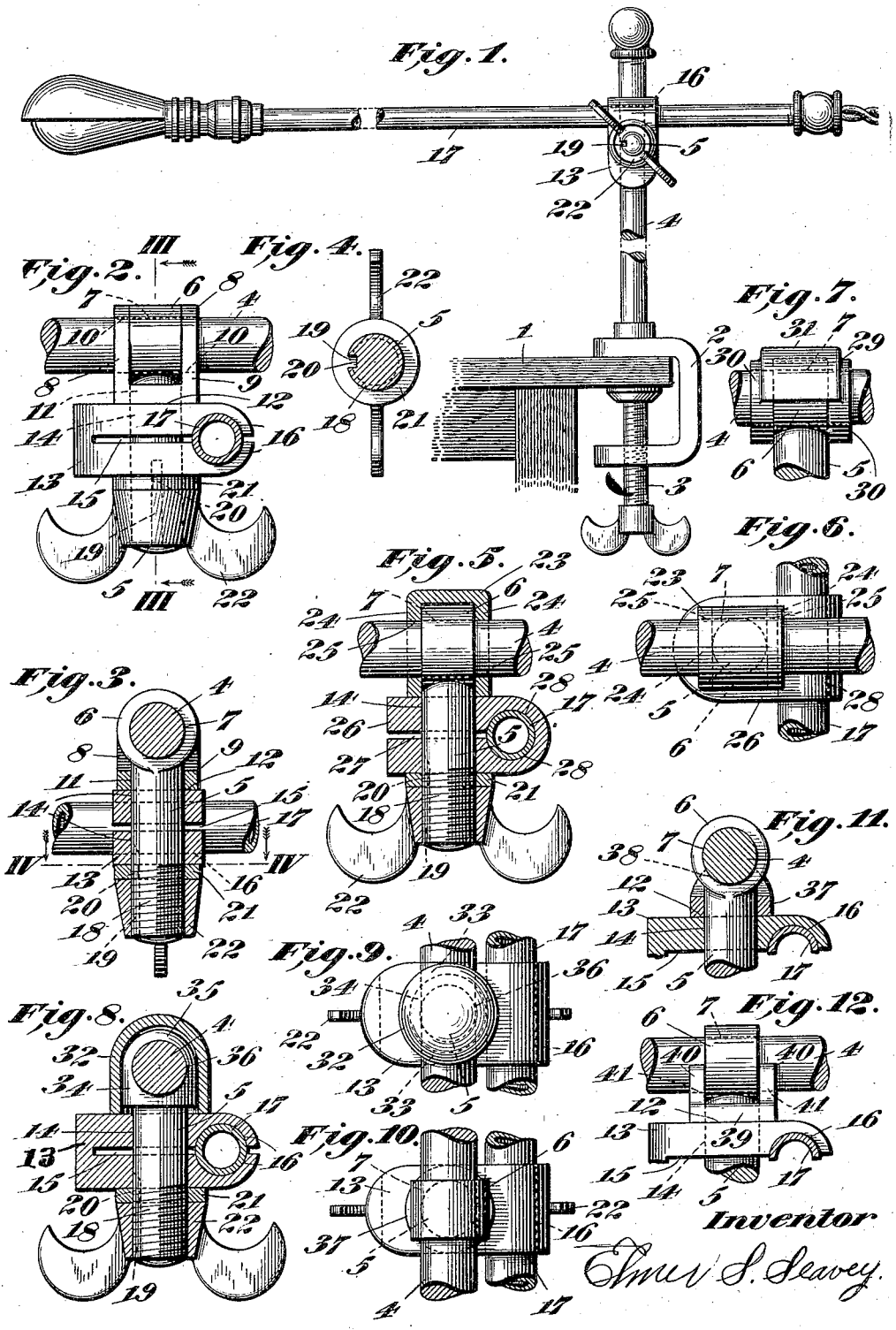
Inventor
Elmer S. Seavey Patented Oct. 2, 1923.

1,469,448

UNITED STATES PATENT OFFICE.

ELMER S. SEAVEY, OF JOHNSTOWN, PENNSYLVANIA.

FLEXIBLE JOINT.

Application filed April 3, 1922. Serial No. 548,942.

*To all whom it may concern:*

Be it known that I, ELMER S. SEAVEY, a citizen of the United States, and residing in the city of Johnstown, in the county of Cambria and State of Pennsylvania, have invented certain new and useful Improvements in Flexible Joints; and I hereby declare the following to be a full, clear, and exact description of the invention, such as will enable others skilled in the art to which it appertains to make and use the same.

My invention relates to flexible joint connections, and particularly to flexible clamping joints whereby two elements such as two pipes or rods may be sustained in any desired longitudinally adjusted, vertically adjusted, or angularly adjusted position relative to each other.

One of the objects of my invention is to provide a very simple and effective form of flexible clamping connection between two elements, so that the elements may be readily shifted longitudinally relative to each other and as readily clamped so firmly in their adjusted positions that they can not be accidentally shifted therefrom.

Another object of my invention is to provide a flexible joint having means for clamping two elements in their longitudinally adjusted position, so constructed as to permit the elements to be rotated relative to each other so as to secure any desired angular adjustment of the elements without however, releasing any of the pressure of the clamp, and without in any way affecting the clamping action.

A further object of my invention is to provide a construction in which two elements may be moved to any desired position vertically or horizontally by a slight push or pull, and so formed that the elements will remain in their adjusted position until moved again.

Another object of the invention is to provide a construction of this character in which the elements may be moved forward or backward to shorten or lengthen them relative to the pivotal centers of the elements by slightly releasing the clamping pressure.

A further object of the invention is to provide a flexible clamping joint in which the gripping or clamping power of a screw-threaded clamping-bolt is used, to simultaneously clamp both elements supported by the flexible clamping joint, the device being so formed that the slackening or tightening up of this one screw-threaded clamping-bolt will act to release both elements to permit of their longitudinal adjustment, or will tighten up both elements.

Another object of my invention is to construct a flexible clamping joint, in such a manner that either of the clamping members may be rotated without unscrewing or affecting the clamping action of the nut.

Still another object of the invention is to provide a flexible joint connection in which the head of this screw-threaded clamping-bolt is so constructed as to act as one of the jaws of the clamping member. The head of the screw-threaded clamping-bolt being formed with a perforation or eye through which one of the supporting elements pass, while a bridge-block engages the side of the head of the screw-threaded clamping-bolt, having a perforation therein on opposite sides of the head of the screw-threaded clamping-bolt which register with the perforation or eye in the head of the screw-threaded clamping-bolt and act as gripping jaws for the same elements. A split clamping-block having a perforation therethrough extending transversely to the split formed in the block, and having the shank of the screw-threaded clamping-bolt extending through the same, and formed with jaws therein for receiving and holding the other supporting element. A washer is keyed to the screw-threaded clamping-bolt and engages the side of the split clamping-block opposite the head of the screw-threaded clamping-bolt, and a nut is screwed on the screw-threaded end of the bolt for increasing or decreasing frictional engagement between the clamping members and the supporting elements, in such a manner that when the parts are assembled and the nut is screwed tight on the screw-threaded clamping-bolt the jaws of the split clamping-block firmly grip the supporting element mounted therein while at the same time the perforation in the head of the screw-threaded clamping-bolt and the perforations in the bridge-block are forced in opposite directions firmly gripping the other supporting element.

Having thus given a general description of my invention, I will now, in order to make the same more clear, refer to the accompanying one sheet of drawings, in which like characters of reference indicate like parts:—

Figure 1 is a side elevation of an electric light bracket illustrating one form of application for which my invention may be used.

Figure 2 is a side elevation illustrating one of flexible joint I may use drawn on a larger scale than that shown in Figure 1.

Figure 3 is a vertical longitudinal sectional elevation taken on the line III—III of Figure 2, the screw-threaded clamping-bolt being shown in elevation.

Figure 4 is a transverse sectional elevation taken on the line IV—IV of Figure 3.

Figure 5 is a vertical longitudinal sectional elevation of a modified form of flexible joint I may use.

Figure 6 is a top plan view of the flexible joint illustrated in Figure 5.

Figure 7 is a detail side elevation showing another form of bridge-block.

Figure 8 is a vertical longitudinal sectional elevation illustrating an inverted cup shaped bridge-block with the head of the screw-threaded clamping-bolt formed to fit therein.

Figure 9 is a top plan view of the flexible joint illustrated in Figure 8.

Figure 10 is a top plan view of another form of bridge-block I may use, which may be a plain washer, or have upwardly extending engaging surfaces as shown in Figure 11.

Figure 11 is a detail sectional elevation, the section being taken centrally through the annular bridge-block or washer shown in Figure 10, and Figure 12 is a detail side elevation illustrating a rectangular form of washer or bridge-block bearing member I may use.

Referring now to the characters of reference on the drawings, and first to Figures 1, 2, 3 and 4, the numeral 1 indicates the device to which the standard is attached, which may be a table or bench, as shown, or it may be a lathe, or any other machine or the like, to which is secured the clamp 2, by means of the adjustable thumb-screw 3. To the clamp 2 is secured a standard 4, extending vertically therefrom upon which is mounted my flexible joint, comprising a bolt 5, having its head 6 preferably formed cylindrical transversely to the length of the bolt as illustrated in Figures 2, 3, 5, 6, 7, 10, 11 and 12, with an eye or perforation 7 extending longitudinally entirely through the head of the bolt as shown. The ends of the cylindrical head 6 of the bolt 5 are flat and are preferably made flush with the sides of the shank of the bolt, to engage the upwardly extending legs 8 of a bridge-block 9, having perforations therein as at 10, which are in alignment with the eye or perforation 7 in the head of the bolt through which the standard 4 extends and is firmly held when the nut on the bolt is screwed tight therein. This bridge-block 9 has a perforation 11 for the passage of the shank of the bolt 5, and a flat friction bottom face 12, for engaging a split clamping-block 13, mounted on the shank of the bolt and which has a perforation therethrough as at 14, for that purpose, transversely to the line of the split 15, and arc-shaped jaws 16, formed therein at one side of the bolt for engaging the bracket arm 17 for supporting an electric light socket and lamp, as shown, or any other device of the like. The end of the bolt is screw-threaded as at 18 and formed with a key-way 19 for receiving the key projection 20 formed integral with a washer 21, and adapted to engage the side of the split clamping-block 13, on the opposite side to that engaged by the bridge-block 9, and a clamping-nut 22 is screwed on the screw-threaded end of the bolt by means of which when the nut is screwed tight upon the bolt the arc-shaped jaws 16 of the split clamping-block 13 firmly grip the bracket arm 17, and at the same time the side face of the split clamping-block contacts with the friction bottom face 12 of the bridge-block 9, the standard 4 being firmly held by engaging the upper face of the eye or perforation 7 formed in the bolt and the inner face of the perforations 10, formed in the legs of the bridge-block, but allowing the flexible joint at all times to be rotated around the standard 4 at will.

In Figures 5 and 6 I have illustrated a flexible joint in which the clamping-bolt wing-nut and washer are of the same construction as shown and described for Figures 1, 2, 3 and 4, and in these two figures as well as in Figures 7 to 10 both inclusive, where the parts are of the same construction, the same reference numerals will be given them. In Figures 5 and 6 however the bridge-block 23 is shown in an inverted position to that shown in Figures 1, 2, 3 and 4, the ends of the legs 24 having perforations 25 formed therein and extending downwardly and contacting with the split clamping-block. In these two figures I have shown the split clamping-block 26 formed with the split 27 extending from the opposite end of the clamping-block. The split extending from the end of the clamping-block to the perforation forming arc-shaped gripping jaws 28, 28, in the closed end of the clamping-block 26, for clamping the bracket arm 17.

In Figure 7 I have illustrated a bridge 29 having annular portions 30, and having a semi-circular portion 31 connecting them together.

In Figures 8 and 9 I have shown the bridge-block 32 of inverted cup shape, the edges of the cup engaging the side face of the split clamping-block 13 and having perforations 33 for the passage of the standard 4. The head 34 of the bolt 5 being formed longitudinally cylindrical with its end rounded as at 35 to conform to the shape of the interior of the cup-shaped bridge-block 32, and also has an eye or perforation therein as at 36 for the passage of the standard 4.

In Figures 10 and 11 I have shown a flexible joint in which is used an annular member 37 for a bridge-block, which may be a plain washer, but preferably having upwardly extending arc-shaped jaws 38 at each side thereof for engaging the standard 4, as more clearly illustrated in Figure 11, and in Figure 12 I have shown a portion of a flexible joint having a bridge-block 39 with a rectangular base with outwardly extending legs 40 with arc-shaped jaws formed therein as at 41 to engage the standard 4.

With my improved flexible joint when the nut is screwed on the threaded end of the bolt tight the joint may be rotated either around the standard 4, or the split clamping-blocks 13 or 26 and bracket arm 17 may be rotated around the bolt as their axis of rotation, at will by a slight push or pull as desired, to give any required angular adjustment.

While I have shown and described my flexible joint as being applied to a portable bracket supporting an electric light, I wish it understood that it can be used for other purposes equally as well, where it is desired to secure similar results.

Although I have shown and described my invention in considerable detail, I do not wish to be limited to the exact and specific details shown and described, but may use such substitutions, modifications or equivalents thereof as are embraced within the scope of my invention or as pointed out in the claims.

Having thus described my invention what I claim and desire to secure by Letters Patent is:—

1. In a flexible joint, comprising a pair of supporting elements, a clamping-bolt having a perforated head and flat side faces for receiving one of the supporting elements, a bridge-block U-shaped in cross-section with its sides engaging the flat side faces of the head of the bolt mounted on the bolt having perforations therein on each side of the bolt in alignment with the perforations formed in the head of the bolt, a resilient clamping member rotatably mounted upon the clamping-bolt and frictionally engaging the bridge-block and adapted to hold the other supporting element, a washer keyed to the bolt, and a nut on the bolt for increasing or decreasing frictional engagement between the clamping members and supporting elements.

2. In a flexible joint, comprising a pair of supporting elements, a clamping-bolt having a perforated head and vertical side faces and a screw-threaded end, a bridge-block U-shaped in cross-section with its inner sides of its legs engaging the vertical side faces of the head of the bolt mounted on the bolt having perforations therein on each side of the bolt in alignment with the perforation in the head of the bolt forming jaws for engaging one of the supporting elements, a resilient clamping member rotatably mounted upon the clamping-bolt and frictionally engaging the bridge-block having jaws formed therein adapted to hold the other supporting element, a washer keyed to the screw-threaded end of the bolt and contacting with the resilient clamping member, and a nut on the screw-threaded end of the bolt for engaging the washer for increasing or decreasing frictional engagement between the clamping members and supporting elements.

3. In a flexible joint, comprising a pair of rods, a clamping-bolt having a cylindrical perforated head and screw-threaded end, a bridge-block U-shaped in cross-section mounted on the bolt having gripping surfaces formed in alignment with the perforation in the head of the bolt for engaging one of the rods, a resilient clamping member rotatably mounted upon the clamping-bolt and engaging the bridge-block having jaws formed therein adapted to hold the other rod, a washer keyed to the screw-threaded end of the bolt and contacting with the resilient clamping member, and a nut on the screw-threaded end of the bolt for engaging the washer for increasing or decreasing frictional engagement between the clamping members and supporting elements.

4. In a flexible joint, comprising a pair of rods, a clamping-bolt having a cylindrical perforated head and screw-threaded end with a keyway formed therein, a bridge-block U-shaped in cross-section mounted on the bolt having gripping surfaces formed in alignment with the perforation in the head of the bolt between which one of the rods is adapted to be held, a split clamping-block rotatably mounted upon the clamping-bolt and engaging the bridge-block, having jaws formed therein at one side of the bolt adapted to hold the other rod, a washer having a key formed integral therewith mounted on and engaging the keyway on the screw-threaded end of the bolt and contacting with the split clamping-block, and a nut on the screw-threaded end of the bolt for engaging the washer for increasing or decreasing frictional engagement between the clamping members and rods.

5. In a flexible joint, comprising a pair of rods, a clamping-bolt having a cylindrical perforated head formed at right angles to the shank of the bolt, a U-shaped bridge-block having its legs extending on either side of the head of the bolt, perforations extending through the head of the bolt and the legs of the bridge-block formed in alignment with each other between which one of the rods is adapted to be held, a split clamping-block rotatably mounted on the bolt and having one side frictionally engaging the bridge-block, jaws formed in the split clamping-block at one side of the bolt for holding the other rod, a washer keyed to the bolt and engaging the split clamping-block on the side opposite to that engaged by the bridge-block, and a nut on the bolt engaging the washer for increasing or decreasing frictional engagement between the clamping members and rods.

6. In a flexible joint, comprising a pair of rods, a clamping-bolt having a cylindrical head formed at right angles to the shank of the bolt, a U-shaped bridge-block having its legs disposed on ether side of the head of the bolt, perforations extending through the head of the bolt and the legs of the bridge-block formed in alignment with each other through which one of the rods extend and is adapted to be held, a split clamping-block rotatably mounted upon the bolt and frictionally engaging the bridge-block, having jaws formed therein for holding the other rod, a washer keyed to the bolt, and a nut engaging the washer for increasing or decreasing frictional engagement between the rods and clamping members.

7. In a flexible joint, comprising a pair of rods, a clamping-bolt having a cylindrical head formed at right angles to the shank of the bolt, a U-shaped bridge-block having its legs disposed on either side of the head of the bolt, perforations extending through the head of the bolt and the legs of the bridge-block formed in alignment with each other through which one of the rods extend and is adapted to be held, a clamping-block rotatably mounted upon the bolt and frictionally engaging the bridge-block, jaws formed in the clamping-block for holding the other rod, a washer keyed to the bolt and contacting with the clamping-block on the side opposite to that engaged by the bridge-block, and a nut on the end of the bolt engaging the washer for increasing or decreasing frictional engagement between the rods and the clamping members.

8. In a flexible joint, comprising a pair of rods, a clamping-block having a screw-threaded end with a keyway formed therein and a head with flat side faces flush with the sides of the shank of the bolt, a U-shaped bridge-block having its legs disposed so as to engage the flat sides of the head of the bolt, perforations extending through the head of the bolt and the legs of the bridge-block formed in alignment with each other through which one of the rods extend and is adapted to be held, a split clamping-block rotatably mounted upon the bolt and frictionally engaging the bridge-block, jaws formed in the split clamping-block at one side of the bolt for clamping the other rod, a washer keyed to the bolt and contacting with the split clamping-block on the side opposite to that engaging the bridge-block, and a nut on the end of the bolt engaging the washer for increasing or decreasing frictional engagement between the rods and the clamping members.

9. In a flexible joint, comprising a pair of rods, a clamping-bolt having a head with flat side faces, a U-shaped bridge-block mounted on the bolt having its legs disposed so as to inclose the flat sides of the head of the clamping-bolt, perforations extending through the head of the bolt and the legs of the bridge-block adapted to hold one of the rods, a split clamping-block rotatably mounted on the bolt having jaws formed therein for holding the other rod, a washer keyed to the bolt and engaging the split clamping-block, and a nut on the end of the bolt for increasing or decreasing frictional engagement between the clamping members and rods.

10. In a flexible joint, comprising a pair of rods, a clamping-bolt having a screw-threaded end with a keyway formed therein, said bolt having a head with flat side faces, a U-shaped bridge-block mounted on the bolt and having its legs disposed on either side of the flat sides of the head of the clamping-bolt, perforations extending through the head of the bolt and the legs of the bridge-block adapted to hold one of the rods, a split clamping-block rotatably mounted on the bolt having jaws formed therein at one side of the bolt for holding the other rod, a washer having an integral key formed thereon for engaging the keyway formed in the bolt and contacting with the split clamping-block, a nut on the screw-threaded end of the bolt for increasing or decreasing frictional engagement between the clamping members and rods—and means whereby the rods may be rotated in any direction without increasing or decreasing the frictional engagement between the clamping members and rods.

In witness whereof I hereunto affix my signature.

ELMER S. SEAVEY.